United States Patent
Gao

(10) Patent No.: US 11,343,806 B2
(45) Date of Patent: May 24, 2022

(54) UPLINK CONTROL CHANNEL TRANSMISSION METHOD AND DEVICE

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 223 days.

(21) Appl. No.: 16/623,377

(22) PCT Filed: Apr. 27, 2018

(86) PCT No.: PCT/CN2018/084874
§ 371 (c)(1),
(2) Date: Dec. 16, 2019

(87) PCT Pub. No.: WO2018/228067
PCT Pub. Date: Dec. 20, 2018

(65) Prior Publication Data
US 2020/0187194 A1    Jun. 11, 2020

(30) Foreign Application Priority Data
Jun. 16, 2017 (CN) .......................... 201710457821.1

(51) Int. Cl.
H04W 72/04      (2009.01)
H04L 5/00       (2006.01)

(52) U.S. Cl.
CPC ....... *H04W 72/0413* (2013.01); *H04L 5/0048* (2013.01)

(58) Field of Classification Search
None
See application file for complete search history.

(56) References Cited

U.S. PATENT DOCUMENTS 9,247,535 B2      1/2016  Hu et al.
2018/0123766 A1*  5/2018  Ahn .......................... H04L 1/18
(Continued)

FOREIGN PATENT DOCUMENTS

CN    103178926 A    6/2013
CN    105827371 A    8/2016
(Continued)

OTHER PUBLICATIONS

Zte et al., "NR PUCCH in long duration", 3GPP TSG RAN WG1 Meeting #88, Athens, Greece, Feb. 13-17, 2017, total 5 pages, R1-1701589.

(Continued)

*Primary Examiner* — Robert C Scheibel
*Assistant Examiner* — Gautam Sharma
(74) *Attorney, Agent, or Firm* — Kilpatrick Townsend & Stockton, LLP

(57) ABSTRACT

Disclosed in the present application are a uplink control channel transmission method and device, for solving the problems, in the prior art, that no relevant solution for defining the transmission structure of a long NR-PUCCH with different lengths in consideration with whether the intra-slot frequency hopping is supported is available yet. The method includes: determining a transmission length or format of a uplink control channel (PUCCH) in a slot; determining a transmission structure of the PUCCH on the basis of the transmission length or format; and transmitting the PUCCH in the slot according to the transmission structure.

18 Claims, 2 Drawing Sheets

(56) References Cited

U.S. PATENT DOCUMENTS

| | | | | |
|---|---|---|---|---|
| 2018/0331807 | A1* | 11/2018 | Kim | H04L 5/0053 |
| 2019/0222254 | A1* | 7/2019 | Kim | H04L 5/00 |
| 2019/0230647 | A1* | 7/2019 | Yang | H04L 5/0057 |
| 2019/0393992 | A1* | 12/2019 | Xiong | H04L 5/0007 |
| 2020/0052835 | A1* | 2/2020 | Xiong | H04L 1/1861 |
| 2020/0267718 | A1* | 8/2020 | Park | H04L 27/2602 |

FOREIGN PATENT DOCUMENTS

| | | |
|---|---|---|
| CN | 106160988 A | 11/2016 |
| CN | 106559198 A | 4/2017 |
| TW | 201531129 A | 8/2015 |
| WO | 2016182242 A1 | 11/2016 |

OTHER PUBLICATIONS

NTT DOCOMO et al., "PUCCH in long-duration for UCI of up to 2 bits", 3GPP TSG RAN WG1 Meeting #88bis, Spokane, USA Apr. 3-7, 2017, total 5 pages, R1-1705741.

Mitsubishi Electric, "Transmit diversity for DFTsOFDM-based PUCCH in long duration", 3GPP TSG-RAN WG1 #89, Hangzhou, China, 1s—May 19, 2017, total 11 pages, R1-1707804.

Panasonic, "Discussion on design for long-PUCCH considering coverage", 3GPP TSG RAN WG1 Meeting #89, Hangzhou, P.R. China, May 15-19, 2017, total 7 pages, R1-1708087.

CATT, "Long duration PUCCH structure", 3GPP TSG RAN WG1 Meeting #89, Hangzhou, P.R. China May 15-19, 2017, total 4 pages, R1-1707504.

NTT DOCOMO, INC."Long-PUCCH for up to 2 bits", 3GPP TSG RAN WG1 Meeting #89, Hangzhou, P.R. China May 15-19, 2017, total 4 pages, R1-1708473.

Qualcomm Incorporated,"Channel Multiplexing for Long PUCCH", 3GPP TSG RAN WG1 Meeting #89, Hangzhou, CN May 15-19, 2017, total 8 pages, R1-1708619.

LG Electronics: "Overall structure of long NR-PUCCH formats", 3GPP TSG RAN WG1 Meeting #89, R1-1707640, Hangzhou, P.R. China May 15-19, 2017.

LG Electronics: "Design of long NR-PUCCH for more than 2 bits", 3GPP TSG RAN WG1 Meeting #89, R1-1707642, Hangzhou, P.R, China May 15-19, 2017.

LG Electronics, "Design of long NR-PUCCH for up to 2 bits", 3GPP TSG RAN WG1 Meeting 89, R1-1707641, May 6, 2017.

Huawei, HiSilicon, "Long duration PUCCH structure". 3GPP TSG RAN WG1 Meeting #89, R1-1706953, Hangzhou, China, May 15-19, 2017.

* cited by examiner

UPLINK CONTROL CHANNEL TRANSMISSION METHOD AND DEVICE

The present application is a National Stage of International Application No. PCT/CN2018/084874, filed on Apr. 27, 2018, which claims priority to Chinese Patent Application No. 201710457821.1, entitled "UPLINK CONTROL CHANNEL TRANSMISSION METHOD AND DEVICE", filed to Patent Office of the People's Republic of China on Jun. 16, 2017, both of which are incorporated herein by reference in their entireties.

FIELD

The present application relates to the technical field of communication, in particular relates to a uplink control channel transmission method and device.

BACKGROUND

With the development and change of mobile communication service requirements, organizations such as the international telecommunication union (ITU) and the 3rd generation partnership project (3GPP) take up research on a novel wireless communication system (such as 5G NR (5 Generation New Radio Access Technology). The novel wireless communication system defines a novel frame structure and supports different baseband parameters (numerology, including parameters such as subcarrier spacing).

For different baseband parameters, the length of one subframe is defined to be 1 ms, one subframe contains a plurality of slots corresponding to the different baseband parameters, the number of the slots in one subframe may be different, but the length of one subframe is required to be 1 ms. For the different baseband parameters, one slot may contain 7 or 14 symbols such as (OFDM (Orthogonal Frequency Division Multiplexing) or DFT-S-OFDM (Discrete Fourier Transform-Spreading-OFDM)). For example, when the subcarrier spacing is 30 kHz, it is supposed that one slot is appointed or configured to contain 7 symbols, one subframe is required to contain 4 slots in order to meet the condition that the length of one subframe is 1 ms; and it is supposed that one slot is appointed or configured to contain 14 symbols, one subframe is required to contain 2 slots in order to meet the condition that the length of one subframe is 1 ms. One slot may have various slot structures, and different structures correspond to different uplink and downlink resource partitioning in one slot. For example, a plurality of symbols in one slot may be all used for downlink transmission, namely DL only slot, may be all used for uplink transmission, namely UL only slot, or may be partially used for uplink transmission and partially used for downlink transmission, namely DL+UL slot. The slot structures may be informed to a terminal in a semi-static state by RRC signaling or dynamically informed to a terminal by multicast public signaling, so that dynamic changes to the slot structures are realized.

The number of the uplink symbols contained in one slot may be changed, and therefore, two NR-PUCCHs, namely a long NR-PUCCH (Physical Uplink Control Channel) and a short NR-PUCCH, are defined in the 5G NR system, wherein the long NR-PUCCH may be transmitted by occupying 4-14 symbols in one slot, and uplink control information (UCI) and a reference signal (RS) are transmitted in a time division multiplexing (TDM) way, namely UCI and RS are transmitted by occupying different symbols.

In order to improve the uplink transmission performance, a frequency hopping structure may be used in the plurality of symbols occupied by the long NR-PUCCH to obtain frequency domain diversity gains; of course, the frequency hopping structure may not be used to increase the multiplexing capacity of a user. The PUCCH in an LTE (Long Term Evolution) system only supports the transmission taking the subframe as a unit, the lengths of the symbols are unchanged, and therefore, only one transmission structure is required to define which symbols in the transmission structure are used to transmit the UCI and which symbols are used to transmit the RS. No relevant solution for defining the transmission structure of the long NR-PUCCH is available yet at present.

SUMMARY

The embodiment of the present application provides a uplink control channel transmission method and device to solve the problems, in the prior art, that no relevant solution for defining a transmission structure of a long NR-PUCCH is available yet.

The specific technical solution provided by the embodiment of the present application is as follows.

On the first aspect, the embodiment of the present application provides a uplink control channel transmission method including:

determining a transmission length or format of a uplink control channel (PUCCH) in a slot;

determining a transmission structure of the PUCCH on the basis of the transmission length or format; and transmitting the PUCCH in the slot according to the transmission structure.

In a possible implementation, determining a transmission structure of the PUCCH on the basis of the transmission length or format includes at least one of followings:

determining the transmission structure to be one of URRU, RURU, RUUR and URUR when the transmission length is 4 symbols or the transmission length corresponding to the format is 4 symbols;

determining the transmission structure to be one of URRUU, UURRU, RUURU, RURUU and URURU when the transmission length is 5 symbols or the transmission length corresponding to the format is 5 symbols;

determining the transmission structure to be one of URRRUU, UURRRU, URRURU, URUURR, URUURU, RURURU and URURUR when the transmission length is 6 symbols or the transmission length corresponding to the format is 6 symbols;

determining the transmission structure to be one of UURRRUU, URRUURU, URUURRU and URURURU when the transmission length is 7 symbols or the transmission length corresponding to the format is 7 symbols;

determining the transmission structure to be one of UURRRRUU, URRUURRU, RURURURU and URURURUR when the transmission length is 8 symbols or the transmission length corresponding to the format is 8 symbols;

determining the transmission structure to be one of UURRRRUUU, UUURRRUU, URRUURRUU, URRUURRU and URURURURU when the transmission length is 9 symbols or the transmission length corresponding to the format is 9 symbols;

determining the transmission structure to be one of UURRRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;

determining the transmission structure to be one of UUURRRRRUUU, URRRUUURRUU, URRUUURRRUU and URURURURURU when the transmission length is 11 symbols or the transmission length corresponding to the format is 11 symbols;

determining the transmission structure to be one of UUURRRRRRUUU, URRRUUURRRUU, URRRUUUURRRU, URURURURURUR and RURURURURURU when the transmission length is 12 symbols or the transmission length corresponding to the format is 12 symbols;

determining the transmission structure to be one of UUURRRRRRUUUU, UUUURRRRRUUU, URRRUUUURRRUU, UURRRUUURRRUU, URRRUUUURRRU and URURURURURURU when the transmission length is 13 symbols or the transmission length corresponding to the format is 13 symbols; or determining the transmission structure to be one of UUURRRRRRUUUU, UUUURRRRRRUUUU, UURRRUUURRRUU, URRRRUUUURRRUU, UUUURRRRRRUUUU, UURRRUUUURRRUU, URURURURURUR and RURURURURURURU when the transmission length is 14 symbols or the transmission length corresponding to the format is 14 symbols;

wherein, U represents for a symbol position mapped by uplink control information (UCI), and R represents for a symbol position mapped by a reference signal (RS).

In a possible implementation, when the PUCCH is transmitted in the slot according to the transmission structure, the method further includes:

performing time-domain orthogonal spreading among a quantity N1 U contained in the transmission structure by adopting an orthogonal sequence with length N1 and performing time-domain orthogonal spreading among a quantity N2 R contained in the transmission structure by adopting an orthogonal sequence with length N2 when the PUCCH does not use a frequency hopping structure in the slot.

In a possible implementation, when the transmission length is 4 symbols or the transmission length corresponding to the format is 4 symbols, N1=N2=2;

when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

In a possible implementation, when the PUCCH is transmitted in the slot according to the transmission structure, the method further includes:

dividing the transmission structure into two parts;

performing, in a first part including a quantity N3 U and a quantity N4 R, time-domain orthogonal spreading among the quantity N3 U by adopting an orthogonal sequence with length N3 and performing time-domain orthogonal spreading among the quantity N4 R by adopting an orthogonal sequence with length N4; and performing, in a second part including a quantity N5 U and a quantity N6 R, time-domain orthogonal spreading among the quantity N5 U by adopting an orthogonal sequence with length N5 and performing time-domain orthogonal spreading among the quantity N6 R by adopting an orthogonal sequence with length N6.

In a possible implementation, dividing the transmission structure into two parts includes:

determining one or more positions from the first symbol to the $$\left\lfloor \frac{A}{2} \right\rfloor$$

th symbol in the transmission structure as a first part and a remaining position from the $$\left( A - \left\lfloor \frac{A}{2} \right\rfloor \right)$$

th symbol to the Ath symbol as a second part, wherein A is the transmission length or the transmission length corresponding to the format; or determining one or more positions from the first symbol to the $$\left\lfloor \frac{A}{2} \right\rfloor$$

th symbol in the transmission structure as a first part and a remaining position from the $$\left( A - \left\lfloor \frac{A}{2} \right\rfloor \right)$$

th symbol to the Ath symbol as a second part, wherein A is the transmission length or the transmission length corresponding to the format.

In a possible implementation, when the transmission length is 8 symbols or the transmission length corresponding to the format is 8 symbols, N3=N4=N5=N6=2;

when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

In a possible implementation, before the transmission structure is divided into two parts, the method further includes:

judging whether the transmission length or the transmission length corresponding to the format is larger than or equal to a preset threshold or not, wherein the preset threshold is 6 or 8; and in response to that the transmission length or the transmission length corresponding to the format is larger than or equal to a preset threshold, dividing the transmission structure into two parts.

In a possible implementation, the first part and the second part are transmitted on different frequency domain resources when the PUCCH uses the frequency hopping structure in the slot.

In a possible implementation, with regard to the transmission length or format, the same transmission structure is adopted when the PUCCH uses or does not use the frequency hopping structure in the slot.

On the second aspect, the embodiment of the present application provides a uplink control channel transmission device, including:

a first determining device configured to determine a transmission length or format of a uplink control channel (PUCCH) in a slot;

a second determining device configured to determine a transmission structure of the PUCCH on the basis of the transmission length or format; and a transmission device configured to transmit the PUCCH in the slot according to the transmission structure.

In a possible implementation, the transmission structure is one of URRU, RURU, RUUR and URUR when the transmission length is 4 symbols or the transmission length corresponding to the format is 4 symbols;

the transmission structure is one of URRUU, UURRU, RUURU, RURUU and URURU when the transmission length is 5 symbols or the transmission length corresponding to the format is 5 symbols;

the transmission structure is one of URRRUU, UURRRU, URRURU, URUURR, URUURU, RURURU and URURUR when the transmission length is 6 symbols or the transmission length corresponding to the format is 6 symbols;

the transmission structure is one of UURRRUU, URRUURU, URUURRU and URURURU when the transmission length is 7 symbols or the transmission length corresponding to the format is 7 symbols;

the transmission structure is one of UURRRRUU, URRUURRU, RURURURU and URURURUR when the transmission length is 8 symbols or the transmission length corresponding to the format is 8 symbols;

the transmission structure is one of UURRRRUUU, UUURRRRUU, URRUURRUU, URRUUURRU and URURURURU when the transmission length is 9 symbols or the transmission length corresponding to the format is 9 symbols;

the transmission structure is one of UURRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;

the transmission structure is one of UUURRRRUUU, URRRUUURRUU, URRUUURRRUU and URURURURURU when the transmission length is 11 symbols or the transmission length corresponding to the format is 11 symbols;

the transmission structure is one of UUURRRRRUUU, URRRUUURRUU, URRRUUUURRRU, URURURURUR and RURURURURURU when the transmission length is 12 symbols or the transmission length corresponding to the format is 12 symbols;

the transmission structure is one of UUURRRRRRUUU, UUUURRRRRUUU, URRRUUUURRUU, UURRRUUURRUU, URRRUUUUURRRU and URURURURURU when the transmission length is 13 symbols or the transmission length corresponding to the format is 13 symbols;

the transmission structure is one of UUURRRRRRUUU, UUUURRRRRRUUU, UURRRUUURRRUU, URRRRUUUURRRUU, UUUURRRRRUUUU, UURRRUUUURRUU, URURURURURURUR and RURURURURURU when the transmission length is 14 symbols or the transmission length corresponding to the format is 14 symbols;

wherein, U represents for a symbol position mapped by uplink control information (UCI), and R represents for a symbol position mapped by a reference signal (RS).

In a possible implementation, the device further includes:

a first spreading device configured to perform time-domain orthogonal spreading among a quantity N1 U contained in the transmission structure by adopting an orthogonal sequence with length N1 and performing time-domain orthogonal spreading among a quantity N2 R contained in the transmission structure by adopting an orthogonal sequence with length N2 when the PUCCH does not use a frequency hopping structure in the slot in the process of transmitting the PUCCH in the slot according to the transmission structure.

In a possible implementation, when the transmission length is 4 symbols or the transmission length corresponding to the format is 4 symbols, N1=N2=2;

when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

In a possible implementation, the device further includes:

a dividing device configured to divide the transmission structure into two parts when the PUCCH is transmitted in the slot according to the transmission structure; and a second spreading device configured to perform, in a first part including a quantity N3 U and a quantity N4 R, time-domain orthogonal spreading among the quantity N3 U by adopting an orthogonal sequence of which a length N3 and performing time-domain orthogonal spreading among the quantity N4 R by adopting an orthogonal sequence with length N4, and performing, in a second part including a quantity N5 U and a quantity N6 R, time-domain orthogonal spreading among the quantity N5 U by adopting an orthogonal sequence with length N5 and performing time-domain orthogonal spreading among the quantity N6 R by adopting an orthogonal sequence with length N6.

In a possible implementation, the dividing device is further configured to:

determine one or more positions from the first symbol to the $$\left\lfloor \frac{A}{2} \right\rfloor$$

th symbol in the transmission structure as the first part and a remaining position from the $$\left( A - \left\lfloor \frac{A}{2} \right\rfloor \right)$$

th symbol to the Ath symbol as the second part, wherein A is the transmission length or the transmission length corresponding to the format; or determine one or more positions from the first symbol to the $$\left\lfloor \frac{A}{2} \right\rfloor$$

th symbol in the transmission structure as the first part and a remaining position from the $$\left( A - \left\lfloor \frac{A}{2} \right\rfloor \right)$$

th symbol to the Ath symbol as the second part, wherein A is the transmission length or the transmission length corresponding to the format.

In a possible implementation, when the transmission length is 8 symbols or the transmission length corresponding to the format is 8 symbols, N3=N4=N5=N6=2;

when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

In a possible implementation, the device further includes:

a judging device configured to judge whether the transmission length or the transmission length corresponding to the format is larger than or equal to a preset threshold before the transmission structure is divided into two parts, wherein the preset threshold is 6 or 8; and in response to that the transmission length or the transmission length corresponding to the format is larger than or equal to a preset threshold, dividing the transmission structure into two parts.

In a possible implementation, the first part and the second part are transmitted on different frequency domain resources when the PUCCH uses the frequency hopping structure in the slot.

In a possible implementation, with regard to the transmission length or format, the same transmission structure is adopted when the PUCCH uses or does not use the frequency hopping structure in the slot.

On the third aspect, the embodiment of the present application provides a uplink control channel transmission device including a processor, a memory and a transceiver, wherein the transceiver receives and transmits data under the control of the processor, a preset program is stored in the memory, the program in the memory is read by the processor, and the following process is performed according to the program:

determining a transmission length or format of a uplink control channel (PUCCH) in a slot;

determining a transmission structure of the PUCCH on the basis of the transmission length or format; and transmitting the PUCCH in the slot according to the transmission structure.

In a possible implementation, the transmission structure is one of URRU, RURU, RUUR and URUR when the transmission length is 4 symbols or the transmission length corresponding to the format is 4 symbols;

the transmission structure is one of URRUU, UURRU, RUURU, RURUU and URURU when the transmission length is 5 symbols or the transmission length corresponding to the format is 5 symbols;

the transmission structure is one of URRRUU, UURRRU, URRURU, URUURR, URUURU, RURURU and URU-RUR when the transmission length is 6 symbols or the transmission length corresponding to the format is 6 symbols;

the transmission structure is one of UURRRUU, URRUURU, URUURRU and URURURU when the transmission length is 7 symbols or the transmission length corresponding to the format is 7 symbols;

the transmission structure is one of UURRRRUU, URRUURRU, RURURURU and URURURUR when the transmission length is 8 symbols or the transmission length corresponding to the format is 8 symbols;

the transmission structure is one of UURRRRUUU, UUURRRRUU, URRUURRUU, URRUUURRU and URURURURU when the transmission length is 9 symbols or the transmission length corresponding to the format is 9 symbols;

the transmission structure is one of UURRRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;

the transmission structure is one of UUURRRRRUUU, URRRUUURRUU, URRUUURRRUU and URURURU-RURU when the transmission length is 11 symbols or the transmission length corresponding to the format is 11 symbols;

the transmission structure is one of UUURRRRRRUUU, URRRUUURRRUU, URRRUUUURRRU, URURURU-RURUR and RURURURURURU when the transmission length is 12 symbols or the transmission length corresponding to the format is 12 symbols;

the transmission structure is one of UUURRRRRRU-UUU, UUUURRRRRUUU, URRRUUUURRUU, UURRRUUURRRUU, URRRUUUUURRRU and URU-RURURURURU when the transmission length is 13 symbols or the transmission length corresponding to the format is 13 symbols;

the transmission structure is one of UUURRRRRRRU-UUU, UUUURRRRRRUUU, UURRRUUURRRUU, URRRUUUURRRUU, UUURRRRRRUUUU, UURR-RUUUURRRUU, URURURURURURUR and RURURU-RURURURU when the transmission length is 14 symbols or the transmission length corresponding to the format is 14 symbols;

wherein, U represents for a symbol position mapped by uplink control information (UCI), and R represents for a symbol position mapped by a reference signal (RS).

In a possible implementation, the processor is further configured to read the program from the memory and perform following process: when the PUCCH is transmitted in the slot according to the transmission structure, performing time-domain orthogonal spreading among N1 U contained in the transmission structure by adopting an orthogonal sequence with a length N1 and performing time-domain orthogonal spreading among N2 R contained in the transmission structure by adopting an orthogonal sequence with a length N2 when the PUCCH does not use the frequency hopping structure in the slot.

In a possible implementation, when the transmission length is 4 symbols or the transmission length corresponding to the format is 4 symbols, N1=N2=2; when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

In a possible implementation, the processor is further configured to read the program from the memory and perform following process:

dividing the transmission structure into two parts when the PUCCH is transmitted in the slot according to the transmission structure; performing, in a first part including a quantity N3 U and a quantity N4 R, time-domain orthogonal spreading among the quantity N3 U by adopting an orthogonal sequence with length N3 and performing time-domain orthogonal spreading among the quantity N4 R by adopting an orthogonal sequence of which a length N4; and performing, in a second part including a quantity N5 U and a quantity N6 R, time-domain orthogonal spreading among the quantity N5 U by adopting an orthogonal sequence with length N5 and performing time-domain orthogonal spreading among the quantity N6 R by adopting an orthogonal sequence with length N6.

In a possible implementation, the processor is further configured to read the program from the memory and perform following process:

determining one or more positions from the first symbol to the $$\left\lfloor \frac{A}{2} \right\rfloor$$

th symbol in the transmission structure as the first part and a remaining position from the $$\left(A - \left\lfloor \frac{A}{2} \right\rfloor\right)$$

th symbol to the Ath symbol as the second part, wherein A is the transmission length or the transmission length corresponding to the format; or determining one or more positions from the first symbol to the th symbol in the transmission structure as the first part and a remaining position from the $$\left(A - \left\lfloor \frac{A}{2} \right\rfloor\right)$$

th symbol to the Ath symbol as the second part, wherein A is the transmission length or the transmission length corresponding to the format.

In a possible implementation, when the transmission length is 8 symbols or the transmission length corresponding to the format is 8 symbols, N3=N4=N5=N6=2;

when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

In a possible implementation, the processor is further configured to read the program from the memory and perform following process:

judging whether the transmission length or the transmission length corresponding to the format is larger than or equal to a preset threshold or not before the transmission structure is divided into two parts, wherein the preset threshold is 6 or 8; and in response to that the transmission length or the transmission length corresponding to the format is larger than or equal to a preset threshold or not, dividing the transmission structure into two parts.

In a possible implementation, the first part and the second part are transmitted on different frequency domain resources when the PUCCH uses the frequency hopping structure in the slot.

In a possible implementation, with regard to the transmission length or format, the same transmission structure is adopted when the PUCCH uses or does not use the frequency hopping structure in the slot.

Based on the aforementioned technical solution, the embodiment of the present application provides a uplink control channel transmission method and device by which PUCCH transmission structures with different transmission lengths or formats are defined; for the transmission length or format of one PUCCH, UCI and RS structures in the PUCCH transmission structure corresponding to the transmission length or format of the PUCCH are determined; and the PUCCH is transmitted according to the transmission structure when the PUCCH uses or does not use a frequency hopping way, so that the number of the defined PUCCH transmission structures is reduced, and the standard and implementation complexity are simplified.

DETAILED DESCRIPTION OF THE EMBODIMENTS

For the sake of a clearer presentation of the purpose, technical solution and advantages of the present application, the present application will be further described in detail below in combination with accompanying drawings, and clearly, embodiments described below are only illustrative ones, and are not all possible ones of the present application. Based on the embodiments of the present application, all other embodiments obtained by those ordinarily skilled in the art without creative work shall also fall with the protection scope of the present application.

In a 5G NR system, in consideration of the lengths of transmission symbols of different long NR-PUCCH in a slot and whether the intra-slot frequency hopping is supported, it is necessary to define a reasonable transmission structure of a long NR-PUCCH to support different transmission lengths and frequency hopping demands. A clear solution for defining the transmission structure of the long NR-PUCCH with different lengths in consideration of whether intra-slot frequency hopping is supported is not available yet at present.

Figure 1:
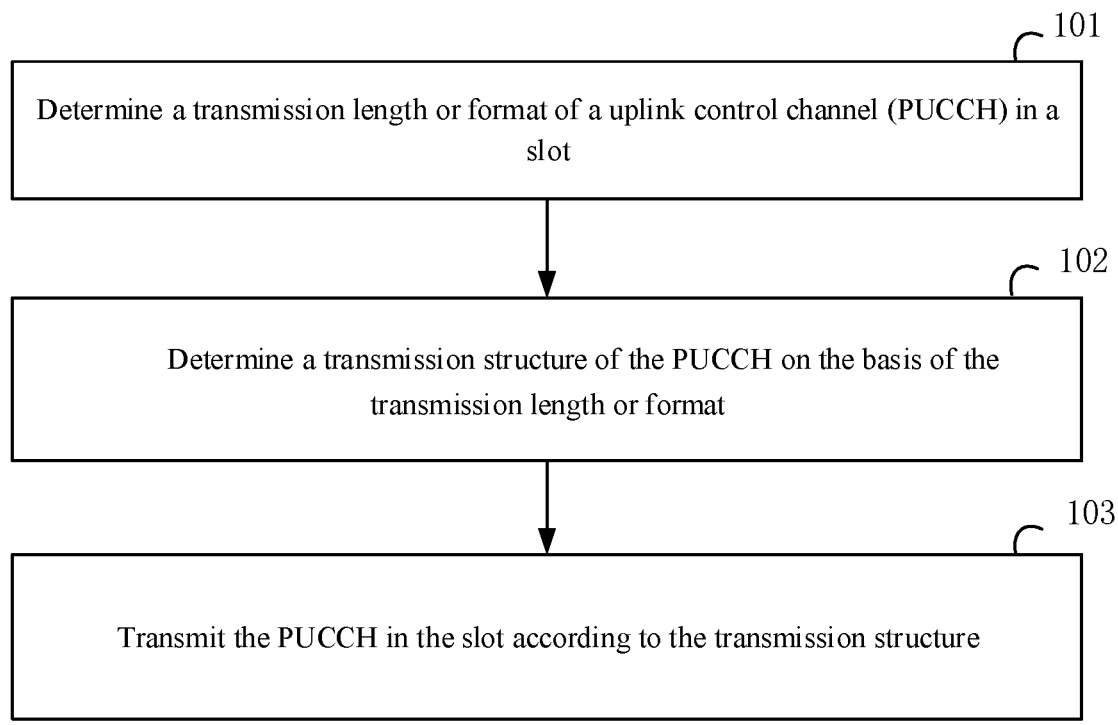
FIG. 1 is a flow schematic diagram of a uplink control channel transmission method in the embodiment of the present application.

In the embodiment of the present application, as shown in FIG. 1, a uplink control channel transmission process is as follows:

step 101: determining a transmission length or format of a uplink control channel (PUCCH) in a slot;

step 102: determining a transmission structure of the PUCCH on the basis of the transmission length or format; and step 103: transmitting the PUCCH in the slot according to the transmission structure.

With regard to the transmission length or format, the same transmission structure is adopted when the PUCCH uses or does not use the frequency hopping structure in the slot.

Particularly, the uplink control channel transmission method in some embodiments is mainly applied to devices such as a terminal and a base station, of course, the uplink control channel transmission method may also be applied to other devices, and the present application has no limitation in this aspect. Some embodiments is typically described in detail by taking an application to the terminal as an example. When the uplink control channel transmission method is applied to the terminal, the terminal performs step S103: transmitting the PUCCH in the slot according to the transmission structure. When the uplink control channel transmission method is applied to the base station, the base station performs the step S103: receiving the PUCCH in the slot according to the transmission structure.

The terminal determines the transmission length or format of the PUCCH required to be transmitted in one slot. The transmission length may be expressed as the number of symbols occupied by the PUCCH. A transmission format corresponding to the transmission length or format may be determined after the transmission length or format is determined, and then, the PUCCH is transmitted in the slot according to the transmission format. A UCI and RS structure is defined for the specific transmission length or format of the PUCCH, wherein the same UCI and RS structure is configured to transmission no matter whether a frequency hopping way is used or not when the PUCCH is transmitted.

Particularly, in some embodiments, any one or a combination of the following transmission structures is defined:

the transmission structure is one of URRU, RURU, RUUR and URUR when the transmission length is 4 symbols or the transmission length corresponding to the format is 4 symbols;

the transmission structure is one of URRUU, UURRU, RUURU, RURUU and URURU when the transmission length is 5 symbols or the transmission length corresponding to the format is 5 symbols;

the transmission structure is one of URRRUU, UURRRU, URRURU, URUURR, URUURU, RURURU and URURUR when the transmission length is 6 symbols or the transmission length corresponding to the format is 6 symbols;

the transmission structure is one of UURRRUU, URRUURU, URUURRU and URURURU when the transmission length is 7 symbols or the transmission length corresponding to the format is 7 symbols;

the transmission structure is one of UURRRRUU, URRUURRU, RURURURU and URURURUR when the transmission length is 8 symbols or the transmission length corresponding to the format is 8 symbols;

the transmission structure is one of UURRRRUUU, UUURRRUU, URRUURRUU, URRUUURRU and URURURURU when the transmission length is 9 symbols or the transmission length corresponding to the format is 9 symbols;

the transmission structure is one of UURRRRRUUU, UUURRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;

the transmission structure is one of UUURRRRRUUU, URRRUUURRUU, URRUUURRRUU and URURURURURU when the transmission length is 11 symbols or the transmission length corresponding to the format is 11 symbols;

the transmission structure is one of UUURRRRRRUUU, URRRUUURRRUU, URRRUUUURRRU, URURURURURUR and RURURURURURU when the transmission length is 12 symbols or the transmission length corresponding to the format is 12 symbols;

the transmission structure is one of UUURRRRRRUUUU, UUUURRRRRRUUU, URRRUUUURRRUU, UURRRUUURRRUU, URRRUUUURRRU and URURURURURURU when the transmission length is 13 symbols or the transmission length corresponding to the format is 13 symbols;

the transmission structure is one of UUURRRRRRRUUUU, UUUURRRRRRRUUU, UURRRUUURRRRUU, URRRRUUUURRRUU, UUUURRRRRRUUUU, UURRRUUUURRRUU, URURURURURURUR and RURURU-RURURURU when the transmission length is 14 symbols or the transmission length corresponding to the format is 14 symbols;

wherein, U represents for a symbol position mapped by uplink control information (UCI), and R represents for a symbol position mapped by a reference signal (RS).

In order to acquire a high multi-user multiplexing capacity, the PUCCH may also be subjected to spreading. Before the step of time-domain orthogonal spreading is performed, whether time-domain orthogonal spreading is used or not may be judged according to a signaling appointed or configured in advance; if yes, the orthogonal spreading operation is performed as follows; or, if not, the orthogonal spreading operation is not performed. Particularly, it may be appointed or configured that time-domain orthogonal spreading is used or not used for all the transmission lengths or time-domain orthogonal spreading is used for a part of transmission lengths and is not used for a part of transmission lengths by adopting the signaling appointed or configured in advance, then, whether time-domain orthogonal spreading is used or not may be determined according to the transmission length, and the corresponding orthogonal spreading operation is performed when it is determined that the time-domain orthogonal spreading is to be used.

Further, it may also be appointed or configured that time-domain orthogonal spreading is not used when frequency hopping is used and time-domain orthogonal spreading is used when frequency hopping is not used, then, whether time-domain orthogonal spreading is used or not may be determined according to whether frequency hopping is used or not, and thus, whether the corresponding orthogonal spreading operation is to be performed or not is determined.

Further, it may also be appointed or configured that, for a part of transmission lengths, time-domain orthogonal spreading is not used when frequency hopping is used and time-domain orthogonal spreading is used when frequency hopping is not used, and that, for the remaining lengths, time-domain orthogonal spreading is used all the time, then, whether time-domain orthogonal spreading is used or not may be determined according to the transmission lengths and whether frequency hopping is used or not, and thus, whether the corresponding operation is to be performed or not is determined.

In one implementation, time-domain orthogonal spreading is performed according to the following method when the PUCCH does not use the frequency hopping structure in the slot:

performing time-domain orthogonal spreading among N1 U contained in the transmission structure by adopting an orthogonal sequence with a length N1, and performing time-domain orthogonal spreading among N2 R contained in the transmission structure by adopting an orthogonal sequence with a length N2.

Particularly, in some embodiments, different transmission structures are defined according to different transmission lengths or formats; and for the transmission structure defined in the former example, time-domain orthogonal spreading may be performed among N1 U contained in the transmission structure by adopting the orthogonal sequence with the length N1 and among N2 R contained in the transmission structure by adopting the orthogonal sequence with the length N2 when the PUCCH does not use the frequency hopping structure in the slot, and N1 may be equal to or unequal to N2.

When the transmission length is 4 symbols or the transmission length corresponding to the format is 4 symbols, N1=N2=2;

when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

Particularly, the transmission structure is one of URRU, RURU, RUUR and URUR when the transmission length is 4 symbols or the transmission length corresponding to the format is 4 symbols. Each of the four formats includes 2 U and 2 R, and therefore, N1=N2=2.

The transmission structure is one of URRUU, UURRU, RUURU, RURUU and URURU when the transmission length is 5 symbols or the transmission length corresponding to the format is 5 symbols. Each of the five formats includes 3 U and 2 R, and therefore, N1=3, N2=2.

The transmission structure is one of URRRUU, UURRRU, URRURU, URUURR, URUURU, RURURU and URURUR when the transmission length is 6 symbols or the transmission length corresponding to the format is 6 symbols, wherein each of a part of structures (URRRUU, UURRRU, URRURU, URUURR, RURURU and URURUR) includes 3 U and 3 R, and therefore, N1=3, N2=3. Each of the other part of structure (URUURU) includes 4 U and 2 R, and therefore, N1=4, N2=2.

The transmission structure is one of UURRRUU, URRUURU, URUURRU and URURURU when the transmission length is 7 symbols or the transmission length corresponding to the format is 7 symbols. Each of the structures includes 4 U and 3 R, and therefore, N1=4, N2=3.

The transmission structure is one of UURRRRUU, URRUURRU, RURURURU and URURURUR when the transmission length is 8 symbols or the transmission length corresponding to the format is 8 symbols. Each of the structures includes 4 U and 4 R, and therefore, N1=4, N2=4.

The transmission structure is one of UURRRRUUU, UUURRRRUU, URRUURRUU, URRUUURRU and URURURURU when the transmission length is 9 symbols or the transmission length corresponding to the format is 9 symbols. Each of the structures includes 5 U and 4 R, and therefore, N1=5, N2=4.

The transmission structure is one of UURRRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols. Each of a part of structures (UURRRRRUUU, UUURRRRRUU, URRRUURRUU, URRUUURRRU, URURURURUR and RURURURURU) includes 5 U and 5 R, and therefore, N1=5, N2=5. Each of the other part of structures (UUURRRRUUU and URRUUURRUU) includes 6 U and 4 R, and therefore, N1=6, N2=4.

The transmission structure is one of UUURRRRRUUU, URRRUUURRUU, URRUUUURRUU and URURURURURU when the transmission length is 11 symbols or the transmission length corresponding to the format is 11 symbols. Each of the structures includes 6 U and 5 R, and therefore, N1=6, N2=5.

The transmission structure is one of UUURRRRRRUUU, URRRUUURRRUU, URRRUUUURRRU, URURURURURUR and RURURURURURU when the transmission length is 12 symbols or the transmission length corresponding to the format is 12 symbols. Each of the structures includes 6 U and 6 R, and therefore, N1=6, N2=6.

The transmission structure is one of UUURRRRRRRUUU, UUUURRRRRRUUU, URRRUUUURRRUU, URRRUUUURRRUU, URRRUUUUURRRU and URURURURURURU when the transmission length is 13 symbols or the transmission length corresponding to the format is 13 symbols. Each of the structures includes 7 U and 6 R, and therefore, N1=7, N2=6.

The transmission structure is one of UUURRRRRRRUUU, UUUURRRRRRUUU, UURRRUUURRRUU, URRRRUUUURRRUU, UUUURRRRRRUUUU, UURRRUUUURRRUU, URURURURURURUR and RURURURURURURU when the transmission length is 14 symbols or the transmission length corresponding to the format is 14 symbols. Each of a part of structures (UUURRRRRRRUUU, UUUURRRRRRUUU, UURRRUUURRRUU, URRRRUUUURRRUU, URURURURURURUR and RURURURURURURU) includes 7 U and 7 R, and therefore, N1=7, N2=7. Each of the other part of structures (UUUURRRRRRUUUU and UURRRUUUURRRUU) includes 8 U and 6 R, and therefore, N1=8, N2=6.

In another implementation, spreading may be performed by adopting the following way no matter whether the PUCCH uses the frequency hopping structure in the slot when time-domain orthogonal spreading is performed:

dividing the transmission structure into two parts;

performing, in a first part including N3 U and N4 R, time-domain orthogonal spreading among N3 U by adopting an orthogonal sequence with a length N3 and performing time-domain orthogonal spreading among N4 R by adopting an orthogonal sequence with a length N4; and performing, in a second part including N5 U and N6 R, time-domain orthogonal spreading among N5 U by adopting an orthogonal sequence with a length N5 and performing time-domain orthogonal spreading among N6 R by adopting an orthogonal sequence with a length N6, wherein N3 and N5 may be identical or different, and N4 and N6 may be identical or different, wherein, dividing the transmission structure into two parts includes:

determining one or more positions the first symbol to the $$\left(\left\lfloor\frac{A}{2}\right\rfloor\right)$$

th symbol in the transmission structure as the first part and a remaining position from the $$\left(A-\left\lfloor\frac{A}{2}\right\rfloor\right)$$

th symbol to the Ath symbol as the second part, wherein A is the transmission length or the transmission length corresponding to the format; or determining one or more positions the first symbol to the $$\left(\left\lfloor\frac{A}{2}\right\rfloor\right)$$

th symbol in the transmission structure as the first part and a remaining position from the $$\left(A-\left\lfloor\frac{A}{2}\right\rfloor\right)$$

th symbol to the Ath symbol as the second part, wherein A is the transmission length or the transmission length corresponding to the format, wherein, when the transmission length is 8 symbols or the transmission length corresponding to the format is 8 symbols, N3=N4=N5=N6=2;

when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

The transmission structure is required to be divided into two parts according to the grouping way no matter whether time-domain spreading is required or not when the PUCCH uses the frequency hopping structure in the slot, and the first part and the second part are transmitted on different frequency domain resources.

Particularly, in some embodiments, before the step of dividing the transmission structure corresponding to the transmission length into two parts is performed, whether the transmission length corresponding to the PUCCH is larger than or equal to a preset threshold or not may also be judged first, wherein the preset threshold may be set to be 6 or 8, of course, the preset threshold may also be set to be other values in a specific implementation process, and the present application has no limitation in this aspect. Further, the transmission structure corresponding to the transmission length is divided into two parts when the transmission length corresponding to the PUCCH is determined to be larger than or equal to the preset threshold.

During dividing, the position from the first symbol to the $$\left(\left\lfloor\frac{A}{2}\right\rfloor\right)$$

th symbol in the transmission structure is determined as the first part, and the remaining position from the $$\left(A-\left\lfloor\frac{A}{2}\right\rfloor\right)$$

th symbol to Ath symbol is determined as the second part. Or, the position from the first symbol to the $$\left(\left\lfloor\frac{A}{2}\right\rfloor\right)$$

th symbol in the transmission structure is determined as the first part, and the remaining position from the $$\left(A-\left\lfloor\frac{A}{2}\right\rfloor\right)$$

th symbol to the Ath symbol is determined as the second part, wherein A is the transmission length or the transmission length corresponding to the format. For example, the transmission structure is one of URRRUU, UURRRU, URRURU, URUURR, URUURU, RURURU and URURUR when the transmission length is 6 symbols or the transmission length corresponding to the format is 6 symbols. A=6, $$\left\lfloor\frac{A}{2}\right\rfloor=3,$$

and therefore, in the structure, the position from the first symbol to the third symbol is determined as the first part, and the remaining position from the fourth symbol to the sixth symbol is determined as the second part. For the transmission structure URRRUU, the first part is URR, and the second part is RUU.

Each part may be subjected to time-domain orthogonal spreading after each transmission structure is divided into two parts in this way.

The transmission structure is one of UURRRRUU, URRUURRU, RURURURU and URURURUR when the transmission length is 8 symbols or the transmission length corresponding to the format is 8 symbols. The first part corresponds to structures corresponding to the former four positions in the structures, and the second part corresponds to structures corresponding to the last four positions in the structures. The structures corresponding to the former four positions in the structures may include 2 U and 2 R, the structures corresponding to the last four positions may include 2 U and 2 R, and therefore, N3=N4=N5=N6=2.

The transmission structure is one of UURRRRUUU, UUURRRRUU, URRUURRUU, URRUUURRU and URURURURU when the transmission length is 9 symbols or the transmission length corresponding to the format is 9 symbols.

When the first part corresponds to structures corresponding to the former five positions in the structures and the second part corresponds to structures corresponding to the last four positions in the structures, the structures corresponding to the former five positions of a part of structures (UUURRRRUU, URRUURRUU, URRUUURRU and URURURURU) in the structures may include 3 U and 2 R, the structures corresponding to the last four positions may include 2 U and 2 R, and therefore, N3=3, N4=2, N5=N6=2.

When the first part corresponds to structures corresponding to the former four positions in the structures and the second part corresponds to structures corresponding to the last five positions in the structures, the structures corresponding to the former four positions of a part of structures (UURRRRUUU, URRUURRUU, URRUUURRU and URURURURU) in the structures may include 2 U and 2 R, the structures corresponding to the last five positions may include 3 U and 2 R, and therefore, N3=N4=2, N5=3, N6=2.

The transmission structure is one of UURRRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols.

When the first part corresponds to structures corresponding to the former five positions in the structures and the second part corresponds to structures corresponding to the last five positions in the structures, the structures corresponding to the former five positions of a part of structures (UUURRRRRUU, URRUUURRU, URURURURUR and URRUUURRUU) in the structures may include 3 U and 2 R, the structures corresponding to the last five positions may include 2 U and 3 R, and therefore, N3=3, N4=2, N5=2, N6=3. The structures corresponding to the former five positions of the other part of structures (UURRRRRUUU, URRRUURRUU and RURURURURU) may include 2 U and 3 R, the structures corresponding to the last five positions may include 3 U and 2 R, and therefore, N3=2, N4=3, N5=3 and N6=2. The structures corresponding to the former five positions of another part of structure (UUURRRRUUU) may 3 U and 2 R, the structures corresponding to the last five positions may include 3 U and 2 R, and therefore, N3=3, N4=2, N5=3 and N6=2.

The transmission structure is one of UUURRRRRUUU, URRRUUURRUU, URRUUURRRUU and URURURURURU when the transmission length is 11 symbols or the transmission length corresponding to the format is 11 symbols.

When the first part corresponds to structures corresponding to the former five positions in the structures and the second part corresponds to structures corresponding to the last six positions in the structures, the structures corresponding to the former five positions of a part of structures (UUURRRRRUUU, URRUUURRRUU and URURURURURU) in the structures may include 3 U and 2 R, the structures corresponding to the last six positions may include 3 U and 3 R, and therefore, N3=3, N4=2, N5=N6=3. The structures corresponding to the former five positions of the other part of structure (URRRUUURRUU) may include 2 U and 3 R, the structures corresponding to the last six positions may include 4 U and 2 R, and therefore, N3=2, N4=3, N5=4, N6=2.

When the first part corresponds to structures corresponding to the former six positions in the structures and the second part corresponds to structures corresponding to the last five positions in the structures, the structures corresponding to the former six positions of a part of structures (UUURRRRRUUU, URRRUUURRUU and URURURURURU) in the structures may include 3 U and 3 R, the structures corresponding to the last five positions may include 3 U and 2 R, and therefore, N3=3, N4=3, N5=3, N6=2. The structures corresponding to the former six positions of the other part of structure (URRUUURRRUU) may include 4 U and 2 R, the structures corresponding to the last five positions may include 3 U and 2 R, and therefore, N3=4, N4=2, N5=3, N6=2.

The transmission structure is one of UUURRRRRRUUU, URRRUUURRRUU, URRRUUUURRRU, URURURURURUR and RURURURURURU when the transmission length is 12 symbols or the transmission length corresponding to the format is 12 symbols. The first part corresponds to structures corresponding to the former six positions in the structures, and the second part corresponds to structures corresponding to the last six positions in the structures. The structures corresponding to the former six positions in the structures may include 2 U and 2 R, the structures corresponding to the last six positions in the structures may include 2 U and 2 R, and therefore, N3=N4=N5=N6=3.

The transmission structure is one of UUURRRRRRUUU, UUUURRRRRUUU, URRRUUUURRUU, UURRRUUURRRUU, URRRUUUUURRRU and URURURURURURU when the transmission length is 13 symbols or the transmission length corresponding to the format is 13 symbols.

When the first part corresponds to structures corresponding to the former seven positions in the structures and the second part corresponds to structures corresponding to the last six positions in the structures, the structures corresponding to the former seven positions of a part of structure (UUURRRRRRUUUU) in the structures may include 3 U and 4 R, the structures corresponding to the last six positions may include 4 U and 2 R, and therefore, N3=3, N4=4, N5=4, N6=2. The structures corresponding to the former seven positions of the other part of structures (UUUURRRRRUUU, URRRUUUURRUU, UURRRUUURRRUU, URRRUUUUURRRU and URURURURURURU) may include 3 U and 4 R, the structures corresponding to the last six positions may include 4 U and 2 R, and therefore, N3=4, N4=3, N5=3, N6=3.

When the first part corresponds to structures corresponding to the former six positions in the structures and the second part corresponds to structures corresponding to the last seven positions in the structures, the structures corresponding to the former six positions of a part of structures (UUURRRRRRUUUU, URRRUUUURRUU, UURRRUUURRUU, URRRUUUUURRRU and URURURURURURU) in the structures may include 3 U and 3 R, the structures corresponding to the last seven positions may include 4 U and 3 R, and therefore, N3=3, N4=3, N5=4, N6=3. The structures corresponding to the former six positions of the other part of structure (UUUURRRRRUUU) may include 4 U and 2 R, the structures corresponding to the last seven positions may include 3 U and 4 R, and therefore, N3=4, N4=2, N5=3, N6=4.

The transmission structure is one of UUURRRRRRRU-UUU, UUUURRRRRRUUU, UURRRUUURRRUU, URRRRUUUURRUU, UUUURRRRRUUUU, UURR-RUUUURRRUU, URURURURURURUR and RURURU-RURURURU when the transmission length is 14 symbols or the transmission length corresponding to the format is 14 symbols. The first part corresponds to structures corresponding to the former seven positions in the structures, and the second part corresponds to structures corresponding to the last seven positions in the structures. The structures corresponding to the former seven positions of a part of structures (UUURRRRRRUUUU, URRRRUUUURRUU and RURURURURURURU) in the structures may include 3 U and 4 R, the structures corresponding to the last seven positions may include 4 U and 3 R, and therefore, N3=3, N4=4, N5=4, N6=3. The structures corresponding to the last seven positions of the other part of structures (UUUURRRRRUUUU and UURRRUUUURRUU) may include 4 U and 3 R, the structures corresponding to the last seven positions may include 4 U and 3 R, and therefore, N3=4, N4=3, N5=4, N6=3. The structures corresponding to the former seven positions of another part of structures (UUUURRRRRRUUU, UURRRUUURRRUU and URURURURURURUR) may include 4 U and 3 R, the structures corresponding to the last seven positions may include 3 U and 4 R, and therefore, N3=4, N4=3, N5=3, N6=4.

Based on the same inventive concept, the embodiment of the present application provides a uplink control channel transmission device which is applied to a terminal or a base station; when the device is applied to the terminal, a transmission device 203 corresponds to a transmitting behavior; and when the device is applied to the base station, the transmission device 203 corresponds to a receiving behavior.

Figure 2:
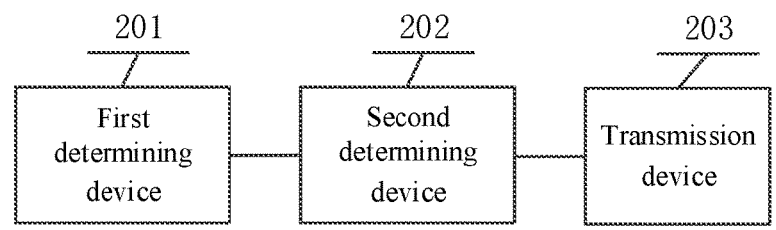
FIG. 2 is a structural schematic diagram of a device in the embodiment of the present application.

The specific implementation of the device may refer to the description of the embodiment of the method, and repeated descriptions will not be given anymore. As shown in FIG. 2, the device includes:

a first determining device 201 configured to determine a transmission length or format of a uplink control channel (PUCCH) in a slot;

a second determining device 202 configured to determine a transmission structure of the PUCCH on the basis of the transmission length or format; and a transmission device 203 configured to transmit the PUCCH in the slot according to the transmission structure.

In a possible implementation, the transmission structure is one of URRU, RURU, RUUR and URUR when the transmission length is 4 symbols or the transmission length corresponding to the format is 4 symbols;

the transmission structure is one of URRUU, UURRU, RUURU, RURUU and URURU when the transmission length is 5 symbols or the transmission length corresponding to the format is 5 symbols;

the transmission structure is one of URRRUU, UURRRU, URRURU, URUURR, URUURU, RURURU and URU-RUR when the transmission length is 6 symbols or the transmission length corresponding to the format is 6 symbols;

the transmission structure is one of UURRRUU, URRUURU, URUURRU and URURURU when the transmission length is 7 symbols or the transmission length corresponding to the format is 7 symbols;

the transmission structure is one of UURRRUU, URRUURRU, RURURURU and URURURUR when the transmission length is 8 symbols or the transmission length corresponding to the format is 8 symbols;

the transmission structure is one of UURRRRUUU, UUURRRUU, URRUURRUU, URRUUURRU and URURURURU when the transmission length is 9 symbols or the transmission length corresponding to the format is 9 symbols;

the transmission structure is one of UURRRRUUU, UUURRRRUU, URRRUURRUU, URRUUURRU, URURURURUR, RURURURURU, UUURRRRUUU and URRUUURRUU when the transmission length is 10 symbols or the transmission length corresponding to the format is 10 symbols;

the transmission structure is one of UUURRRRUUU, URRRUUURRUU, URRUUURRRUU and URURURU-RURU when the transmission length is 11 symbols or the transmission length corresponding to the format is 11 symbols;

the transmission structure is one of UUURRRRRUUU, URRRUUURRRUU, URRRUUUURRRU, URURURU-RURUR and RURURURURURU when the transmission length is 12 symbols or the transmission length corresponding to the format is 12 symbols;

the transmission structure is one of UUURRRRRRU-UUU, UUUURRRRRUUU, URRRUUUURRRUU, UURRRUUUURRRUU, URRRUUUUURRRU and URU-RURURURURU when the transmission length is 13 symbols or the transmission length corresponding to the format is 13 symbols;

the transmission structure is one of UUURRRRRRRU-UUU, UUUURRRRRRUUU, UURRRUUUURRRUU, URRRRUUUURRUU, UUUURRRRRUUUU, UURR-RUUUURRRUU, URURURURURURUR and RURURU-RURURURU when the transmission length is 14 symbols or the transmission length corresponding to the format is 14 symbols;

wherein, U represents for a symbol position mapped by uplink control information (UCI), and R represents for a symbol position mapped by a reference signal (RS).

In a possible implementation, the device further includes:

a first spreading device configured to perform time-domain orthogonal spreading among N1 U contained in the transmission structure by adopting an orthogonal sequence with a length N1 and performing time-domain orthogonal spreading among N2 R contained in the transmission structure by adopting an orthogonal sequence with a length N2 when the PUCCH does not use the frequency hopping structure in the slot in the process of transmitting the PUCCH in the slot according to the transmission structure.

In a possible implementation, when the transmission length is 4 symbols or the transmission length corresponding to the format is 4 symbols, N1=N2=2;

when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

In a possible implementation, the device further includes:

a dividing device configured to divide the transmission structure into two parts when the PUCCH is transmitted in the slot according to the transmission structure; and a second spreading device configured to perform, in a first part including N3 U and N4 R, time-domain orthogonal spreading among N3 U by adopting an orthogonal sequence with a length N3 and performing time-domain orthogonal spreading among N4 R by adopting an orthogonal sequence with a length N4 and perform, in a second part including N5 U and N6 R, time-domain orthogonal spreading among N5 U by adopting an orthogonal sequence with a length N5 and performing time-domain orthogonal spreading among N6 R by adopting an orthogonal sequence with a length N6.

In a possible implementation, the dividing device is further configured to:

determine one or more positions the first symbol to the $$\left(\left\lfloor \frac{A}{2} \right\rfloor\right)$$

th symbol in the transmission structure as the first part and a remaining position from the $$\left(A - \left\lfloor \frac{A}{2} \right\rfloor\right)$$

th symbol to the Ath symbol as the second part, wherein A is the transmission length or the transmission length corresponding to the format; or determine one or more positions the first symbol to the $$\left(\left\lfloor \frac{A}{2} \right\rfloor\right)$$

th symbol in the transmission structure as the first part and a remaining position from the $$\left(A - \left\lfloor \frac{A}{2} \right\rfloor\right)$$

th symbol to the Ath symbol as the second part, wherein A is the transmission length or the transmission length corresponding to the format.

In a possible implementation, when the transmission length is 8 symbols or the transmission length corresponding to the format is 8 symbols, N3=N4=N5=N6=2;

when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

In a possible implementation, the device further includes:

a judging device configured to judge whether the transmission length or the transmission length corresponding to the format is larger than or equal to a preset threshold or not before the transmission structure is divided into two parts, wherein the preset threshold is 6 or 8; and if yes, determine to perform the step: dividing the transmission structure into two parts.

In a possible implementation, the first part and the second part are transmitted on different frequency domain resources when the PUCCH uses the frequency hopping structure in the slot.

In a possible implementation, with regard to the transmission length or format, the same transmission structure is adopted when the PUCCH uses or does not use the frequency hopping structure in the slot.

Figure 3:
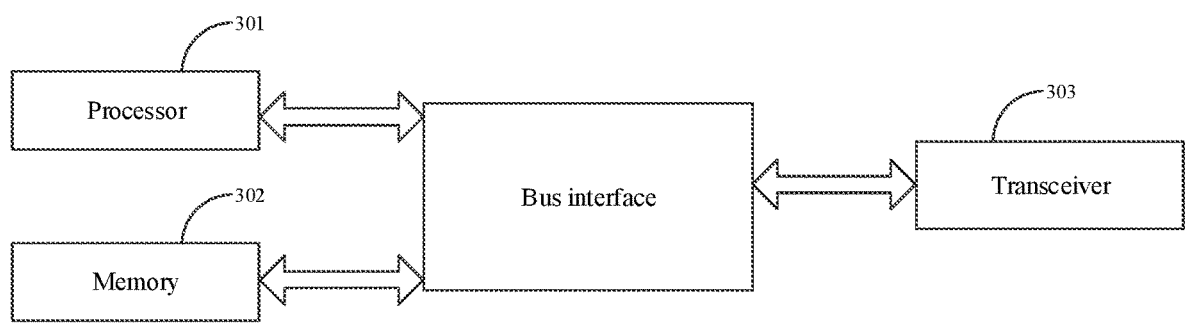
FIG. 3 is a structural schematic diagram of another device in the embodiment of the present application.

Based on the same inventive concept, the embodiment of the present application provides a uplink control channel transmission device, the specific implementation of the device may refer to the description of the embodiment of the method, and repeated descriptions will not be given anymore. As shown in FIG. 3, the device mainly includes a processor 301, a memory 302 and a transceiver 303, wherein the transceiver 303 receives and transmits data under the control of the processor 301, a preset program is stored in the memory 302, the program in the memory is read by the processor 301, and the following process is performed according to the program:

determining, by the processor 301, a transmission length or format of a uplink control channel (PUCCH) in a slot;

determining, by the processor 301, a transmission structure of the PUCCH on the basis of the transmission length or format; and transmitting, by the transceiver 303, the PUCCH in the slot according to the transmission structure, wherein, as shown in FIG. 3, a bus structure may include any number of buses and bridges which are interconnected with each other and is particularly used for linking various circuits of one or more processors 301 represented by the processor 301 and memories represented by the memory 302. The bus architecture is capable of linking various other circuits such as peripheral equipment, a voltage stabilizer and a power management circuit, which is known by those skilled in the art. Therefore, the further description of the bus architecture is omitted herein. A bus interface provides an interface. The transceiver 303 may include a plurality of elements, namely a transmitter and a transceiver, and is provided with a unit for realizing communication with various other devices on a transmission medium. The processor 301 takes charge of managing the bus architecture and common processing, and the memory 302 is capable of storing data used when the processor 301 performs operations.

In a possible implementation, the transmission structure is one of URRU, RURU, RUUR and URUR when the transmission length is 4 symbols or the transmission length corresponding to the format is 4 symbols;

the transmission structure is one of URRUU, UURRU, RUURU, RURUU and URURU when the transmission length is 5 symbols or the transmission length corresponding to the format is 5 symbols;

the transmission structure is one of URRRUU, UURRRU, URRURU, URUURR, URUURU, RURURU and URURUR when the transmission length is 6 symbols or the transmission length corresponding to the format is 6 symbols;

the transmission structure is one of UURRRUU, URRUURU, URUURRU and URURURU when the transmission length is 7 symbols or the transmission length corresponding to the format is 7 symbols;

the transmission structure is one of UURRRRUU, URRUURRU, RURURURU and URURURUR when the transmission length is 8 symbols or the transmission length corresponding to the format is 8 symbols;

the transmission structure is one of UURRRRUUU, UUURRRRUU, URRUURRUU, URRUUURRU and URURURURU when the transmission length is 9 symbols or the transmission length corresponding to the format is 9 symbols;

the transmission structure is one of UURRRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;

the transmission structure is one of UUURRRRRUUU, URRRUUURRUU, URRUUUURRRUU and URURURURURU when the transmission length is 11 symbols or the transmission length corresponding to the format is 11 symbols;

the transmission structure is one of UUURRRRRRUUU, URRRUUURRUU, URRRUUUURRRU, URURURURURUR and RURURURURURU when the transmission length is 12 symbols or the transmission length corresponding to the format is 12 symbols;

the transmission structure is one of UUURRRRRRUUUU, UUUURRRRRRUUU, URRRUUUURRRUU, UURRRUUURRRUU, URRRUUUURRRU and URURURURURURU when the transmission length is 13 symbols or the transmission length corresponding to the format is 13 symbols;

the transmission structure is one of UUURRRRRRRUUU, UUUURRRRRRUUU, UURRRUUURRRUU, URRRRUUUURRRUU, UUUURRRRRRUUUU, UURRRUUUURRRUU, URURURURURURUR and RURURURURURURU when the transmission length is 14 symbols or the transmission length corresponding to the format is 14 symbols;

wherein, U represents for a symbol position mapped by uplink control information (UCI), and R represents for a symbol position mapped by a reference signal (RS).

In a possible implementation, when the PUCCH is transmitted in the slot according to the transmission structure, the processor 301 is further configured to:

perform time-domain orthogonal spreading among N1 U contained in the transmission structure by adopting an orthogonal sequence with a length N1 and perform time-domain orthogonal spreading among N2 R contained in the transmission structure by adopting an orthogonal sequence with a length N2 when the PUCCH does not use the frequency hopping structure in the slot.

In a possible implementation, when the transmission length is 4 symbols or the transmission length corresponding to the format is 4 symbols, N1=N2=2;

when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

In a possible implementation, the processor 301 is further configured to:

divide the transmission structure into two parts when the PUCCH is transmitted in the slot according to the transmission structure;

perform, in a first part including N3 U and N4 R, time-domain orthogonal spreading among N3 U by adopting an orthogonal sequence with a length N3 and perform time-domain orthogonal spreading among N4 R by adopting an orthogonal sequence with a length N4; and perform, in a second part including N5 U and N6 R, time-domain orthogonal spreading among N5 U by adopting an orthogonal sequence with a length N5 and perform time-domain orthogonal spreading among N6 R by adopting an orthogonal sequence with a length N6.

In a possible implementation, the processor 301 is further configured to:

determine one or more positions the first symbol to the $$\left(\left\lfloor \frac{A}{2} \right\rfloor\right)$$

th symbol in the transmission structure as the first part and a remaining position from the $$\left(A-\left\lfloor\frac{A}{2}\right\rfloor\right)$$

th symbol to the Ath symbol as the second part, wherein A is the transmission length or the transmission length corresponding to the format; or determine one or more positions the first symbol to the $$\left(\left\lfloor\frac{A}{2}\right\rfloor\right)$$

th symbol in the transmission structure as the first part and a remaining position from the $$\left(A-\left\lfloor\frac{A}{2}\right\rfloor\right)$$

th symbol to the Ath symbol as the second part, wherein A is the transmission length or the transmission length corresponding to the format.

In a possible implementation, when the transmission length is 8 symbols or the transmission length corresponding to the format is 8 symbols, N3=N4=N5=N6=2;

when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

In a possible implementation, the processor 301 is further configured to:

judge whether the transmission length or the transmission length corresponding to the format is larger than or equal to a preset threshold or not before the transmission structure is divided into two parts, wherein the preset threshold is 6 or 8; and if yes, determine to perform the step: dividing the transmission structure into two parts.

In a possible implementation, the first part and the second part are transmitted on different frequency domain resources when the PUCCH uses the frequency hopping structure in the slot.

In a possible implementation, with regard to the transmission length or format, the same transmission structure is adopted when the PUCCH uses or does not use the frequency hopping structure in the slot.

Based on the technical solution, the embodiment of the present application provides a uplink control channel transmission method and device by which PUCCH transmission structures with different transmission lengths or formats are defined; for the transmission length or format of one PUCCH, UCI and RS structures in the PUCCH transmission structure corresponding to the transmission length or format of one PUCCH are determined; and the PUCCH is transmitted according to the transmission structure when the PUCCH uses or does not use a frequency hopping way, so that the number of the defined PUCCH transmission structures is reduced, and the standard and implementation complexity are simplified.

Those skilled in the art would appreciate that the embodiment of the present application may provide a method, a system, or a computer program product. Therefore, the embodiment of the present application may be implemented in a completely hardware form, in a completely software form, or in a software and hardware combined form. Moreover, the present application may be in a form of a computer program product implemented on one or more readable storage mediums (which include, but are not limited to, magnetic disk memories, optical memories, and the like) including computer available program codes.

The present application is described with reference to a flow diagram and/or a block diagram of the method, equipment (system), and the computer program product in the embodiment of the present application. It should be understood that each flow and/or block in the flow diagram and/or the block diagrams and a combination of the flows and/or blocks in the flow diagram and/or the block diagrams may be implemented by means of computer program instructions. The computer program instructions may be provided for a processor of a general-purpose computer, a special-purpose computer, an embedded processing machine or other programmable data processing equipment to generate a machine, so that the processor of the computer or other programmable data processing equipment executes the instructions to implement the equipment for realizing a specified function in one or more flows in the flow diagram and/or one or more blocks in the block diagram.

The computer program instructions may also be stored in a computer readable memory capable of guiding the computer or other programmable data processing equipment to work in a specific way, so that a manufactured product including instruction equipment is generated by the instructions stored in the computer readable memory, and the instruction equipment realizes the specified function in one or more flows in the flow diagram and/or one or more blocks in the block diagram.

The computer program instructions may also be loaded on the computer or other programmable data processing equipment, and then, a series of operation steps are performed on the computer or other programmable data processing equipment to fulfill computer-based processing, so that the instructions are executed on the computer or other programmable data processing equipment to implement the corresponding step to realize the specific function in one or more flows in the flow diagram and/or one or more blocks in the block diagram.

Clearly, various alterations and modifications may be made by those skilled in the art without departing from the spirit and scope of the present application. Thus, the present application also intends to include all these alterations and modifications which fall within the scope of the claims and their equivalents.

What is claimed is:

1. A uplink control channel transmission method, comprising:
    determining a transmission length or format of a uplink control channel (PUCCH) in a slot;
    determining a transmission structure of the PUCCH on a basis of the transmission length or the format; and
    transmitting the PUCCH in the slot according to the transmission structures;
    wherein the method further comprises:
    performing time-domain orthogonal spreading among a quantity N1U contained in the transmission structure by adopting an orthogonal sequence with length N1 and performing time-domain orthogonal spreading among a quantity N2 R contained in the transmission structure by adopting an orthogonal sequence with length N2 when the PUCCH does not use a frequency hopping structure in the slot wherein U represents for a symbol position mapped by uplink control information (UCI), and R represents for a symbol position mapped by a reference signal (RS).

2. The method according to claim 1, wherein determining a transmission structure of the PUCCH on the basis of the transmission length or the format comprises at least one of followings:
    determining the transmission structure to be one of URRU, RURU, RUUR and URUR when the transmission length is 4 symbols or the transmission length corresponding to the format is 4 symbols;
    determining the transmission structure to be one of URRUU, UURRU, RUURU, RURUU and URURU when the transmission length is 5 symbols or the transmission length corresponding to the format is 5 symbols;
    determining the transmission structure to be one of URRRUU, UURRRU, URRURU, URUURR, URUURU, RURURU and URURUR when the transmission length is 6 symbols or the transmission length corresponding to the format is 6 symbols;
    determining the transmission structure to be one of UURRRUU, URRUURU, URUURRU and URURURU when the transmission length is 7 symbols or the transmission length corresponding to the format is 7 symbols;
    determining the transmission structure to be one of UURRRRUU, URRUURRU, RURURURU and URURURUR when the transmission length is 8 symbols or the transmission length corresponding to the format is 8 symbols;
    determining the transmission structure to be one of UURRRRUUU, UUURRRUU, URRUURRUU, URRUUURRU and URURURURU when the transmission length is 9 symbols or the transmission length corresponding to the format is 9 symbols;
    determining the transmission structure to be one of UURRRRUUU, UUURRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;
    determining the transmission structure to be one of UUURRRRRUUU, URRRUUURRUU, URRUUURRRUU and URURURURURU when the transmission length is 11 symbols or the transmission length corresponding to the format is 11 symbols;
    determining the transmission structure to be one of UUURRRRRUUU, URRRUUURRUU, URRRUUUURRRU, URURURURURUR and RURURURURURU when the transmission length is 12 symbols or the transmission length corresponding to the format is 12 symbols;
    determining the transmission structure to be one of UUURRRRRRUUUU, UUUURRRRRUUUU, URRRUUUURRRUU, UURRRUUURRRUU, URRRUUUURRRUU, URRRUUUUURRRU and URURURURURURU when the transmission length is 13 symbols or the transmission length corresponding to the format is 13 symbols; or
    determining the transmission structure to be one of UUURRRRRRUUUU, UUUURRRRRRUUUU, UURRRUUURRRUU, URRRRUUUURRRUU, UUUURRRRRRUUUU, UURRRUUUURRRUU, URURURURURURUR and RURURURURURURU when the transmission length is 14 symbols or the transmission length corresponding to the format is 14 symbols.

3. The method according to claim 2, wherein when the PUCCH is transmitted in the slot according to the transmission structure, the method further comprises:
    dividing the transmission structure into two parts;
    performing, in a first part comprising a quantity N3 U and a quantity N4 R, time-domain orthogonal spreading among the quantity N3 U by adopting an orthogonal sequence with length N3 and performing time-domain orthogonal spreading among the quantity N4 R by adopting an orthogonal sequence with length N4; and
    performing, in a second part comprising a quantity N5 U and a quantity N6 R, time-domain orthogonal spreading among the quantity N5 U by adopting an orthogonal sequence with length N5 and performing time-domain orthogonal spreading among the quantity N6 R by adopting an orthogonal sequence with length N6.

4. The method according to claim 3, wherein dividing the transmission structure into two parts comprises:
    determining one or more positions from a first symbol to an $$\left\lfloor \frac{A}{2} \right\rfloor$$

th symbol in the transmission structure as the first part and a remaining position from an $$\left(A - \left\lfloor \frac{A}{2} \right\rfloor\right)$$

th symbol to an Ath symbol as the second part, wherein A is the transmission length or the transmission length corresponding to the format; or
    determining one or more positions from the first symbol to the $$\left\lfloor \frac{A}{2} \right\rfloor$$

th symbol in the transmission structure as the first part and a remaining position from the $$\left(A - \left\lfloor \frac{A}{2} \right\rfloor\right)$$

th symbol to the Ath symbol as the second part, wherein A is the transmission length or the transmission length corresponding to the format.

5. The method according to claim 3, wherein,
when the transmission length is 8 symbols or the transmission length corresponding to the format is 8 symbols, N3=N4=N5=N6=2;
when the transmission length is 9 symbols or the transmission length corresponding to the format is 9 symbols, N3=3, N4=2, N5=N6=2; or, N3=N4=2, N5=3, N6=2;
when the transmission length is 10 symbols or the transmission length corresponding to the format is 10 symbols, N3=N5=3, N4=N6=2; or, N3=3, N4=2, N5=2, N6=3; or, N3=2, N4=3, N5=3, N6=2;
when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;
when the transmission length is 12 symbols or the transmission length corresponding to the format is 12 symbols, N3=N4=N5=N6=3;
when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;
when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

6. The method according to claim 3, wherein before the transmission structure is divided into two parts, the method further comprises:
judging whether the transmission length or the transmission length corresponding to the format is larger than or equal to a preset threshold or not, wherein the preset threshold is 6 or 8; and
in response to that the transmission length or the transmission length corresponding to the format is larger than or equal to a preset threshold, dividing the transmission structure into two parts.

7. The method according to claim 3, wherein the first part and the second part are transmitted on different frequency domain resources when the PUCCH uses a frequency hopping structure in the slot.

8. The method according to claim 1, wherein,
when the transmission length is 4 symbols or the transmission length corresponding to the format is 4 symbols, N1=N2=2;
when the transmission length is 5 symbols or the transmission length corresponding to the format is 5 symbols, N1=3, N2=2;
when the transmission length is 6 symbols or the transmission length corresponding to the format is 6 symbols, N1=3, N2=3; or, N1=4, N2=2;
when the transmission length is 7 symbols or the transmission length corresponding to the format is 7 symbols, N1=4, N2=3;
when the transmission length is 8 symbols or the transmission length corresponding to the format is 8 symbols, N1=N2=4;
when the transmission length is 9 symbols or the transmission length corresponding to the format is 9 symbols, N1=5, N2=4;
when the transmission length is 10 symbols or the transmission length corresponding to the format is 10 symbols, N1=N2=5; or, N1=6, N2=4;
when the transmission length is 11 symbols or the transmission length corresponding to the format is 11 symbols, N1=6, N2=5;
when the transmission length is 12 symbols or the transmission length corresponding to the format is 12 symbols, N1=N2=6;
when the transmission length is 13 symbols or the transmission length corresponding to the format is 13 symbols, N1=7, N2=6;
when the transmission length is 14 symbols or the transmission length corresponding to the format is 14 symbols, N1=N2=7; or, N1=8, N2=6.

9. The method according to claim 1, wherein with regard to the transmission length or format, a same transmission structure is adopted when the PUCCH uses or does not use a frequency hopping structure in the slot.

10. A uplink control channel transmission device, comprising a processor, a memory and a transceiver;
wherein, the processor is configured to read a program from the memory and perform following process:
determining a transmission length or format of a uplink control channel (PUCCH) in a slot; determining a transmission structure of the PUCCH on a basis of the transmission length or format; and transmitting the PUCCH in the slot according to the transmission structure;
wherein the processor is further configured to read the program from the memory and perform following process:
performing time-domain orthogonal spreading among a quantity N1 U contained in the transmission structure by adopting an orthogonal sequence with length N1 and performing time-domain orthogonal spreading among a quantity N2 R contained in the transmission structure by adopting an orthogonal sequence with length N2 when the PUCCH does not use a frequency hopping structure in the slot; wherein U represents for a symbol position mapped by uplink control information (UCI), and R represents for a symbol position mapped by a reference signal (RS).

11. The uplink control channel transmission device according to claim 10, wherein the processor is configured to read the program from the memory and perform at least one of following processes:
determining the transmission structure to be one of URRU, RURU, RUUR and URUR when the transmission length is 4 symbols or the transmission length corresponding to the format is 4 symbols;
determining the transmission structure to be one of URRUU, UURRU, RUURU, RURUU and URURU when the transmission length is 5 symbols or the transmission length corresponding to the format is 5 symbols;
determining the transmission structure to be one of URRRUU, UURRRU, URRURU, URUURR, URUURU, RURURU and URURUR when the transmission length is 6 symbols or the transmission length corresponding to the format is 6 symbols; r determining the transmission structure to be one of UURRRUU, URRUURU, URUURRU and URURURU when the transmission length is 7 symbols or the transmission length corresponding to the format is 7 symbols;

determining the transmission structure to be one of UURRRRUU, URRUURRU, RURURURU and URURURUR when the transmission length is 8 symbols or the transmission length corresponding to the format is 8 symbols;

determining the transmission structure to be one of UURRRRUUU, UUURRRRUU, URRUURRUU, URRUUURRU and URURURURU when the transmission length is 9 symbols or the transmission length corresponding to the format is 9 symbols;

determining the transmission structure to be one of UURRRRRUUU, UUURRRRRUU, URRRUURRUU, URRUUURRRU, URURURURUR, RURURURURU, UUURRRRUUU and URRUUURRUU when the transmission length is 10 symbols or the transmission length corresponding to the format is 10 symbols;

determining the transmission structure to be one of UUURRRRRUUU, URRRUUURRUU, URRUUURRRUU and URURURURURU when the transmission length is 11 symbols or the transmission length corresponding to the format is 11 symbols;

determining the transmission structure to be one of UUURRRRRRUUU, URRRUUURRRUU, URRRUUURRRU, URURURURURUR and RURURURURURU when the transmission length is 12 symbols or the transmission length corresponding to the format is 12 symbols;

determining the transmission structure to be one of UUURRRRRRUUUU, UUUURRRRRRUUU, URRRUUUURRRUU, UURRRUUURRRUU, URRRUUUURRRU and URURURURURURU when the transmission length is 13 symbols or the transmission length corresponding to the format is 13 symbols; or determining the transmission structure to be one of UUURRRRRRRUUUU, UUUURRRRRRRUUU, UURRRUUURRRRUU, URRRRUUUURRRUU, UUUURRRRRRUUUU, UURRRUUUURRRUU, URURURURURURUR and RURURURURURURU when the transmission length is 14 symbols or the transmission length corresponding to the format is 14 symbols.

12. The uplink control channel transmission device according to claim 11, wherein when the PUCCH is transmitted in the slot according to the transmission structure, the processor is further configured to read the program from the memory and perform following process:

dividing the transmission structure into two parts; performing, in a first part comprising a quantity N3 U and a quantity N4 R, time-domain orthogonal spreading among the quantity N3 U by adopting an orthogonal sequence with length N3 and performing time-domain orthogonal spreading among the quantity N4 R by adopting an orthogonal sequence with length N4; and performing, in a second part comprising a quantity N5 U and a quantity N6 R, time-domain orthogonal spreading among the quantity N5 U by adopting an orthogonal sequence with length N5 and performing time-domain orthogonal spreading among the quantity N6 R by adopting an orthogonal sequence with length N6.

13. The uplink control channel transmission device according to claim 12, wherein the processor is configured to read the program from the memory and perform following process:

determining one or more positions from a first symbol to the $$\left\lfloor \frac{A}{2} \right\rfloor$$

th symbol in the transmission structure as the first part and a remaining position from the $$\left(A - \left\lfloor \frac{A}{2} \right\rfloor\right)$$

th symbol to an Ath symbol as the second part, wherein A is the transmission length or the transmission length corresponding to the format; or determining one or more positions from the first symbol to the $$\left\lfloor \frac{A}{2} \right\rfloor$$

th symbol in the transmission structure as the first part and a remaining position from the $$\left(A - \left\lfloor \frac{A}{2} \right\rfloor\right)$$

th symbol to the Ath symbol as the second part, wherein A is the transmission length or the transmission length corresponding to the format.

14. The uplink control channel transmission device according to claim 12, wherein, when the transmission length is 8 symbols or the transmission length corresponding to the format is 8 symbols, N3=N4=N5=N6=2; and/or when the transmission length is 9 symbols or the transmission length corresponding to the format is 9 symbols, N3=3, N4=2, N5=N6=2; or, N3=N4=2, N5=3, N6=2;

when the transmission length is 10 symbols or the transmission length corresponding to the format is 10 symbols, N3=N5=3, N4=N6=2, or, N3=3, N4=2, N5=2, N6=3, or, N3=2, N4=3, N5=3, N6=2;

when the transmission length is 11 symbols or the transmission length corresponding to the format is 11 symbols, N3=3, N4=2, N5=N6=3; or, N3=2, N4=3, N5=4, N6=2; or, N3=N4=3, N5=3, N6=2; or, N3=4, N4=2, N5=3, N6=2;

when the transmission length is 12 symbols or the transmission length corresponding to the format is 12 symbols, N3=N4=N5=N6=3;

when the transmission length is 13 symbols or the transmission length corresponding to the format is 13 symbols, N3=4, N4=3, N5=N6=3; or, N3=3, N4=4, N5=4, N6=2; or, N3=N4=3, N5=4, N6=3; or, N3=4, N4=2, N5=3, N6=4;

when the transmission length is 14 symbols or the transmission length corresponding to the format is 14 symbols, N3=N5=4, N4=N6=3; or, N3=3, N4=4, N5=4, N6=3; or, N3=4, N4=3, N5=3, N6=4.

15. The uplink control channel transmission device according to claim 12, wherein the processor is further configured to read the program from the memory and perform following process:

judging whether the transmission length or the transmission length corresponding to the format is larger than or equal to a preset threshold or not before the transmission structure is divided into two parts, wherein the preset threshold is 6 or 8; and in response to that the transmission length or the transmission length corresponding to the format is larger than or equal to a preset threshold, dividing the transmission structure into two parts.

16. The uplink control channel transmission device according to claim 12, wherein the first part and the second part are transmitted on different frequency domain resources when the PUCCH uses a frequency hopping structure in the slot.

17. The uplink control channel transmission device according to claim 10, wherein, when the transmission length is 4 symbols or the transmission length corresponding to the format is 4 symbols, N1=N2=2;

when the transmission length is 5 symbols or the transmission length corresponding to the format is 5 symbols, N1=3, N2=2;

when the transmission length is 6 symbols or the transmission length corresponding to the format is 6 symbols, N1=3, N2=3; or, N1=4, N2=2;

when the transmission length is 7 symbols or the transmission length corresponding to the format is 7 symbols, N1=4, N2=3;

when the transmission length is 8 symbols or the transmission length corresponding to the format is 8 symbols, N1=N2=4;

when the transmission length is 9 symbols or the transmission length corresponding to the format is 9 symbols, N1=5, N2=4;

when the transmission length is 10 symbols or the transmission length corresponding to the format is 10 symbols, N1=N2=5; or, N1=6, N2=4;

when the transmission length is 11 symbols or the transmission length corresponding to the format is 11 symbols, N1=6, N2=5;

when the transmission length is 12 symbols or the transmission length corresponding to the format is 12 symbols, N1=N2=6;

when the transmission length is 13 symbols or the transmission length corresponding to the format is 13 symbols, N1=7, N2=6;

when the transmission length is 14 symbols or the transmission length corresponding to the format is 14 symbols, N1=N2=7; or, N1=8, N2=6.

18. The uplink control channel transmission device according to claim 10, wherein with regard to the transmission length or format, the same transmission structure is adopted when the PUCCH uses or does not use a frequency hopping structure in the slot.

* * * * *